US012688564B2

(12) United States Patent
Sakamoto

(10) Patent No.: US 12,688,564 B2
(45) Date of Patent: Jul. 21, 2026

(54) ELECTRONIC APPARATUS, CONTROL METHOD OF ELECTRONIC APPARATUS, AND NON-TRANSITORY COMPUTER READABLE MEDIUM

(71) Applicant: CANON KABUSHIKI KAISHA, Tokyo (JP)

(72) Inventor: Daisuke Sakamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 18/766,762

(22) Filed: Jul. 9, 2024

(65) Prior Publication Data

US 2025/0022110 A1     Jan. 16, 2025

(30) Foreign Application Priority Data

Jul. 11, 2023     (JP) ................................. 2023-113559

(51) Int. Cl.
G06T 5/80 (2024.01)
G06T 3/047 (2024.01)
G06T 3/12 (2024.01)
G06T 3/40 (2006.01)

(52) U.S. Cl.
CPC ................ G06T 5/80 (2024.01); G06T 3/047 (2024.01); G06T 3/12 (2024.01); G06T 3/40 (2013.01); *G06T 2207/20048* (2013.01)

(58) Field of Classification Search
None
See application file for complete search history.

(56) References Cited

U.S. PATENT DOCUMENTS

2022/0385830 A1 * 12/2022 Shoda .................. H04N 5/2628

FOREIGN PATENT DOCUMENTS

JP     2016-224173 A     12/2016
JP     2017-211641 A     11/2017
JP     2022-183656 A     12/2022

* cited by examiner

*Primary Examiner* — Robert J Craddock
(74) *Attorney, Agent, or Firm* — Carter, DeLuca & Farrell LLP

(57)     ABSTRACT

An electronic apparatus according to the present invention includes a processor, and a memory soring a program which, when executed by the processor, causes the electronic apparatus to execute acquisition processing to acquire a live view image, and execute display control processing to perform geometric transformation for a display range, which is a partial region of the live view image, and to perform control so as to display a geometrically transformed image for display, where the display range is changeable, wherein in the display control processing, control is performed so as to further display an item which makes the region displayed in the live view image identifiable.

17 Claims, 10 Drawing Sheets

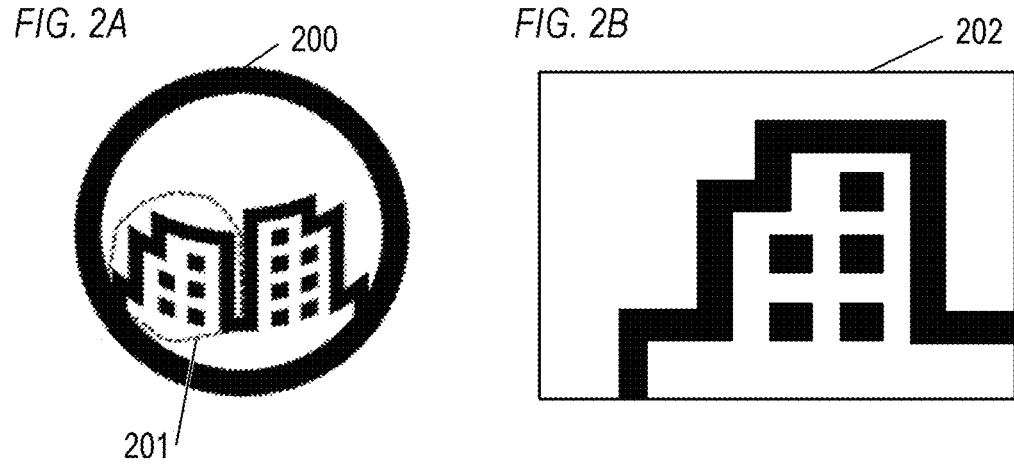
*FIG. 2A*        200             *FIG. 2B*       202
201
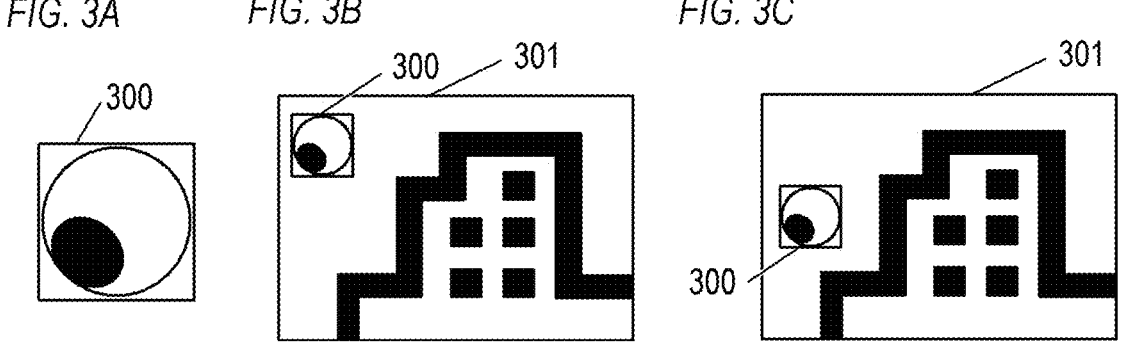
*FIG. 3A*    *FIG. 3B*    *FIG. 3C*
300     300   301      301
300

FIG. 6C

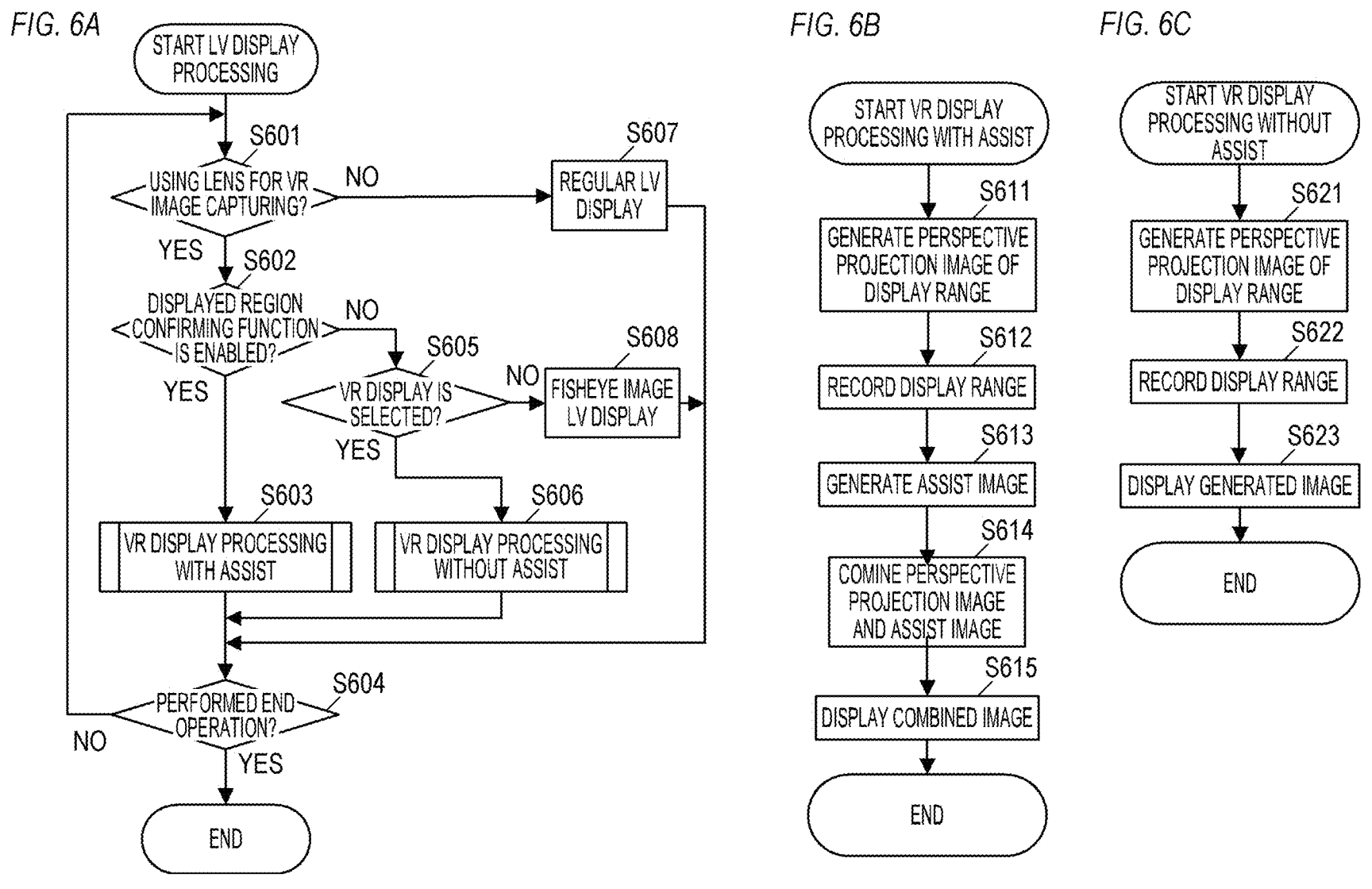

START VR DISPLAY PROCESSING WITHOUT ASSIST

S621 → GENERATE PERSPECTIVE PROJECTION IMAGE OF DISPLAY RANGE

S622 → RECORD DISPLAY RANGE

S623 → DISPLAY GENERATED IMAGE

END

FIG. 6B

START VR DISPLAY PROCESSING WITH ASSIST

S611 → GENERATE PERSPECTIVE PROJECTION IMAGE OF DISPLAY RANGE

S612 → RECORD DISPLAY RANGE

S613 → GENERATE ASSIST IMAGE

S614 → COMINE PERSPECTIVE PROJECTION IMAGE AND ASSIST IMAGE

S615 → DISPLAY COMBINED IMAGE

END

FIG. 6A

START LV DISPLAY PROCESSING

S601 USING LENS FOR VR IMAGE CAPTURING?
NO → S607 REGULAR LV DISPLAY

YES

S602 DISPLAYED REGION CONFIRMING FUNCTION IS ENABLED?
NO → S605 VR DISPLAY IS SELECTED?
NO → S608 FISHEYE IMAGE LV DISPLAY
YES → S606 VR DISPLAY PROCESSING WITHOUT ASSIST

YES → S603 VR DISPLAY PROCESSING WITH ASSIST

S604 PERFORMED END OPERATION?
YES → END
NO

*FIG. 7*
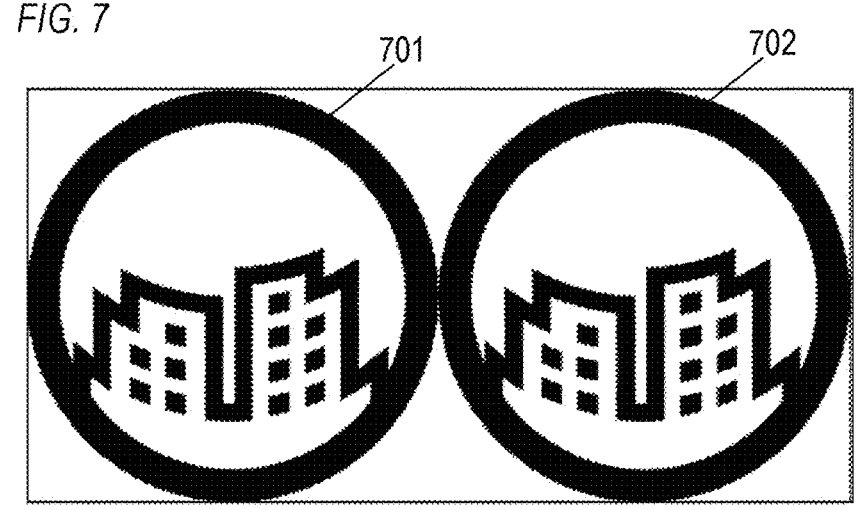
701
702
*FIG. 8A*
*FIG. 8B*
801
802
803
804
805
LEFT
RIGHT
LEFT
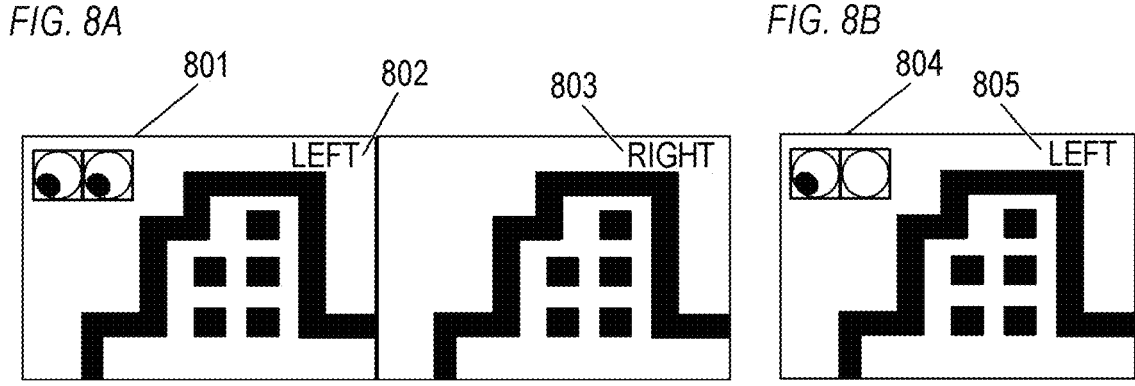

*FIG. 12*

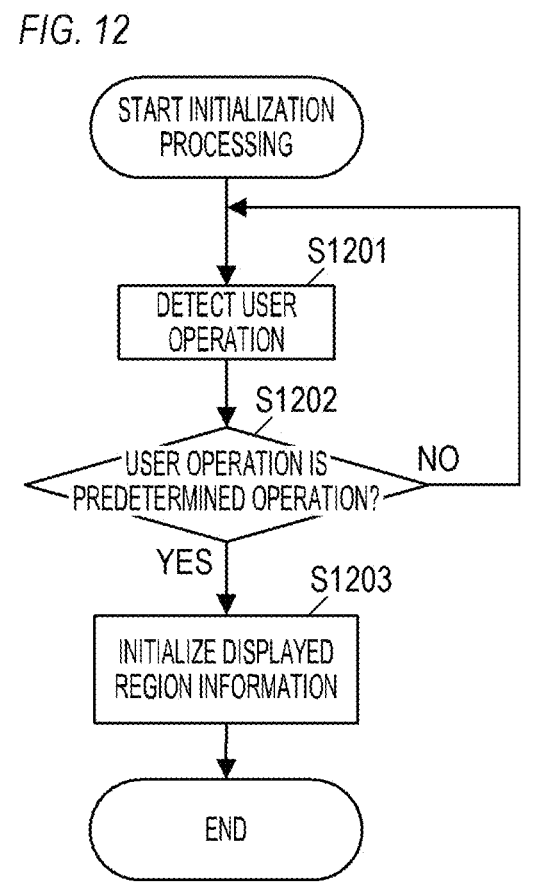

```
         ┌─────────────────────┐
         │  START INITIALIZATION │
         │      PROCESSING       │
         └──────────┬──────────┘
                    │
                    ▼        S1201
         ┌─────────────────────┐
         │    DETECT USER      │
         │     OPERATION       │
         └──────────┬──────────┘
                    │        S1202
              ◇─────────────◇
             ╱ USER OPERATION IS ╲      NO
            ╱ PREDETERMINED OPERATION? ╲────────┐
             ╲                 ╱                 │
              ◇─────────────◇                   │
                    │ YES                        │
                    ▼        S1203               │
         ┌─────────────────────┐                │
         │  INITIALIZE DISPLAYED │                │
         │  REGION INFORMATION   │                │
         └──────────┬──────────┘                │
                    │                            │
                    ▼                            │
         ┌─────────────────────┐                │
         │        END          │                │
         └─────────────────────┘                │
```

ELECTRONIC APPARATUS, CONTROL METHOD OF ELECTRONIC APPARATUS, AND NON-TRANSITORY COMPUTER READABLE MEDIUM

BACKGROUND OF THE INVENTION

Field of the Invention

The present invention relates to an electronic apparatus, a control method of the electronic apparatus, and a non-transitory computer readable medium.

Description of the Related Art

Recently contents using virtual reality (VR) techniques (VR contents) are widespread. Japanese Patent Application Publication No. 2017-211641 and No. 2022-183656 disclose techniques for capturing photographs and videos used for VR contents. Japanese Patent Application Publication No. 2017-211641 discloses a technique to capture an omnidirectional image all at once. Japanese Patent Application Publication No. 2022-183656 discloses a technique to simultaneously acquire two images (two images having parallax with each other) that can be viewed stereoscopically. VR contents are mainly viewed using such a display device as a non-transmission type head-mounted display (HMD).

Images used for VR contents cover a wide range of images, such as a circular fisheye image. In the case of displays such VR contents on an HMD, the display device clips a part of the image as a visual field of the viewer, and displays the image after performing such transformation as perspective projection transformation. Normally the viewer can freely change the range of the visual field.

This means that when an image used for the VR contents is captured, the appearance, including exposure and focus, must be confirmed in advance for the entire range of the visual field of the viewer, so that the generated image becomes as the user intended. In the case of reproducing the visual field of the viewer to perform this confirmation, confirmation omission may be generated, since the display device can display only part of the entire image at one time.

SUMMARY OF THE INVENTION

The present invention provides a technique that allows to easily recognize a region for which an imaging result has been previously confirmed.

An electronic apparatus according to the present invention includes a processor, and a memory soring a program which, when executed by the processor, causes the electronic apparatus to execute acquisition processing to acquire a live view image, and execute display control processing to perform geometric transformation for a display range, which is a partial region of the live view image, and to perform control so as to display a geometrically transformed image for display, where the display range is changeable, wherein in the display control processing, control is performed so as to further display an item which makes the region displayed in the live view image identifiable.

Further features of the present invention will become apparent from the following description of exemplary embodiments with reference to the attached drawings.

BRIEF DESCRIPTION OF THE DRAWINGS

FIGS. 2A and 2B are diagrams indicating a captured image according to Embodiment 1;

FIG. 3A is a diagram indicating an assist image according to Embodiment 1;

FIGS. 3B and 3C are diagrams indicating combined images according to Embodiment 1;

FIG. 6A is a flow chart of LV display processing according to Embodiment 1;

FIG. 6B is a flow chart of VR display processing with assist according to Embodiment 1;

FIG. 6C is a flow chart of VR display processing without assist according to Embodiment 1;

FIG. 7 is a diagram indicating a modification of a captured image;

FIGS. 8A and 8B are modifications of a combined image;

FIG. 12 is a flow chart of initialization processing according to Embodiment 3.

DESCRIPTION OF THE EMBODIMENTS

Embodiments of the present invention will now be described with reference to the drawings. The present invention, however, is not limited to these embodiments.

Embodiment 1

Figure 1:
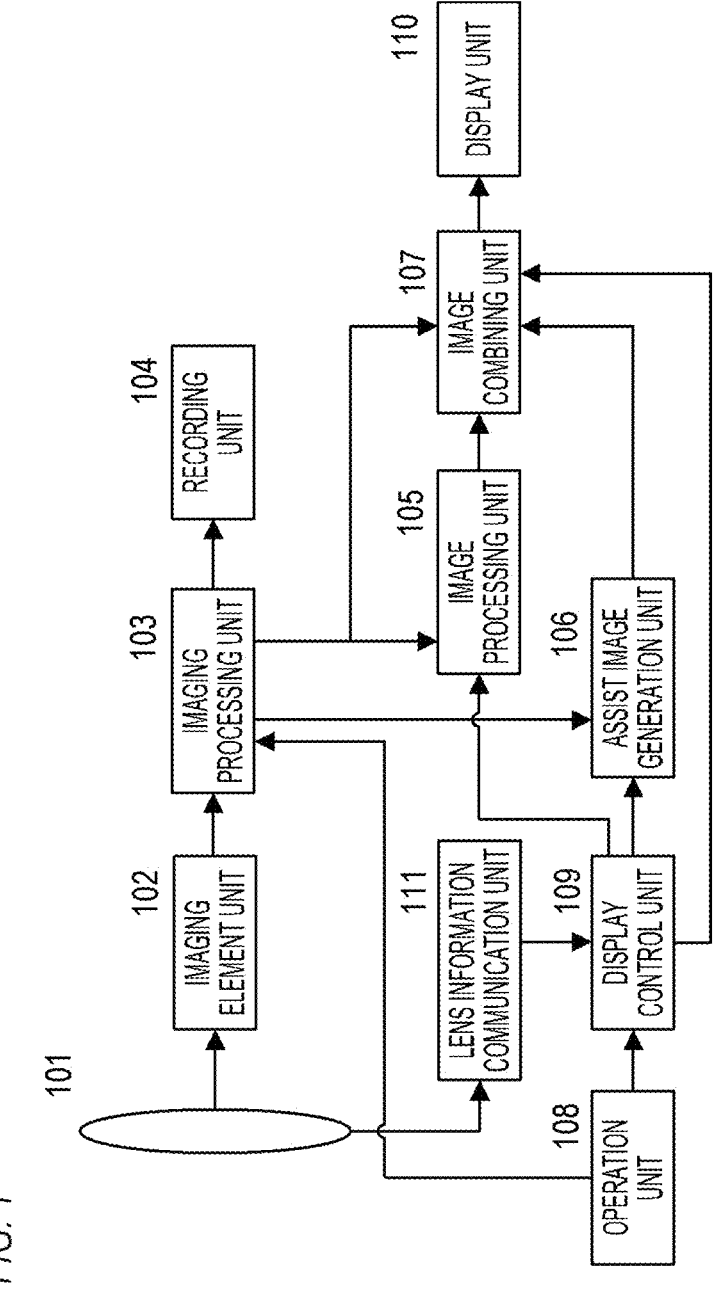
FIG. 1 is a block diagram indicating an imaging device according to Embodiment 1.

Embodiment 1 of the present invention will be described. FIG. 1 is a block diagram indicating an imaging device, which is an example of an electronic apparatus according to Embodiment 1. The imaging device in FIG. 1 includes a lens unit 101, an imaging element unit 102, an imaging processing unit 103, a recording unit 104, an image processing unit 105, an assist image generation unit 106, an image combining unit 107, an operation unit 108, a display control unit 109, a display unit 110, and a lens information communication unit 111.

The lens unit 101 includes an optical system which forms an object image (optical image capturing the object) on an imaging plane of the imaging element unit 102, and has a zoom function, a focus adjustment function, and an aperture adjustment function. The lens unit 101 may or may not be detachable from the imaging device.

The imaging element unit 102 includes an imaging element in which many photoelectric conversion elements are arrayed, and converts an object image formed by the lens unit 101 into image signals. The imaging element is a complementary metal oxide semiconductor (CMOS) image sensor, or a charged coupled device (CCD) image sensor, for example. The imaging element unit 102 includes an A/D convertor to convert image signals (analog signals) acquired by the imaging element into image data, which is digital data. Then the imaging element unit 102 outputs the acquired image data (captured image data).

The imaging processing unit 103 performs image processing on the captured image data received from the imaging element unit 102, such as correcting scratches and the like caused by the imaging element unit 102, and image processing for recording and display.

The recording unit 104 records the image data, processed by the imaging processing unit 103, in a storage medium (not illustrated). The storage medium is, for example, such a recording medium as an SD card. The storage medium may be included in the imaging device, or may be detachable from the imaging device.

The image processing unit 105 performs image processing (geometric transformation) to reduce distortion on the image data processed by the imaging processing unit 103. For example, in the case of using a fisheye lens for the lens unit 101, the perspective projection transformation is performed as the image processing, on a part of the captured circular fisheye image. Thereby an image for display is generated.

The perspective projection transformation according to Embodiment 1 will be described with reference to FIGS. 2A, 2B, 4A and 4B. FIG. 2A is a diagram indicating a circular fisheye image that is captured by the imaging device according to Embodiment 1. As indicated in FIG. 2A, the circular fisheye image processed by the imaging processing unit 103 is a distorted circular image. To reduce this distortion, perspective projection transformation is performed.

When the perspective projection transformation is performed, the image processing unit 105 transforms the circular fisheye image acquired from the imaging processing unit 103 into a hemispherical image. For this processing, a three-dimensional computer graphics library, such as an open graphics library for an embedded system (Open GL ES), for example, may be used. Specifically, each pixel of the acquired circular fisheye image is corresponded to a coordinate system in FIG. 4A, which is constituted of a vertical angle θ with respect to an axis, which is the zenith direction of the captured image, and a horizontal angle ϕ around the axis in the zenith direction. Here it is assumed that the circular fisheye image is an image in a range of 180° in the vertical direction (up/down direction), and 180° in the horizontal direction (left/right direction), and each range of the vertical angle θ and the range of the horizontal angle ϕ is from −90° to 90° range respectively.

Figure 4A:
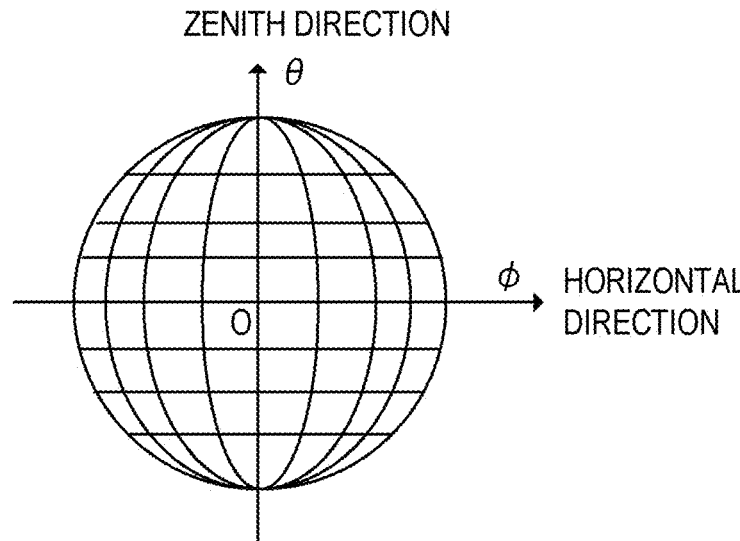
FIGS. 4A and 4B are diagrams for describing transformation from a circular fisheye image to a hemispherical image.
Figure 4B:
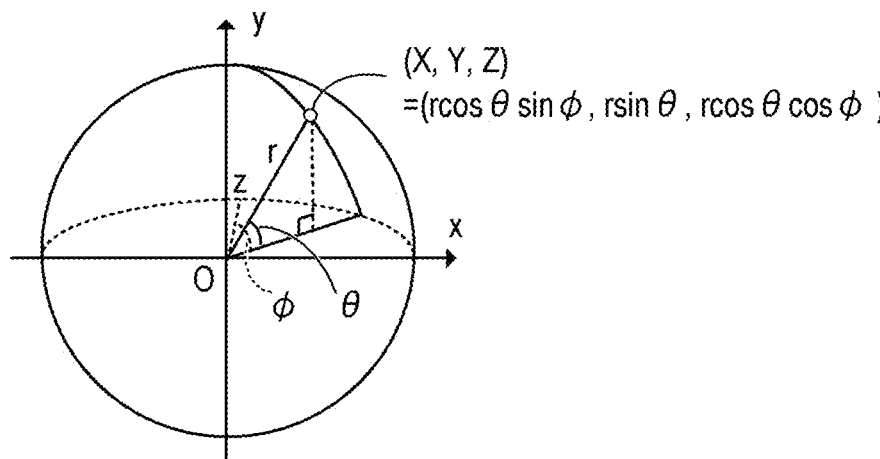

The correspondence between each pixel of the circular fisheye image and the coordinates (θ, ϕ) is determined by a combination and arrangement of the lens unit 101 and the imaging element unit 102. Thereby the image processing unit 105 can correspond each pixel of the circular fisheye image and each point on the sphere indicated in FIG. 4B. If the center of the sphere indicated in FIG. 4B is the origin O, three-dimensional coordinates on the sphere are (X, Y, Z), and the radius of the sphere is r, then the correspondence of the coordinates (θ, ϕ), corresponded to each pixel of the circular fisheye image, and the coordinates (X, Y, Z) on the sphere can be expressed by the following Expressions 1 to 3.

$$X = r\cos(\theta)\sin(\varphi) \qquad \text{(Expression 1)}$$

$$Y = r\sin(\theta) \qquad \text{(Expression 2)}$$

$$Z = r\cos(\theta)\cos(\varphi) \qquad \text{(Expression 3)}$$

By transforming the coordinates of each pixel of the circular fisheye image into the coordinates of the sphere based on the correspondence indicated by Expressions 1 to 3, a hemispherical image (hemispherical image data) can be generated.

In the case of generating an omnidirectional image, a circular fisheye image in a 180° front direction and in a 180° rear direction of a photographer are acquired, and hemispherical images thereof are generated respectively, and each hemispherical image is joined using the above mentioned method, whereby a 360° omnidirectional image can be generated.

As mentioned above, the omnidirectional image and hemispherical image are images distorted in spherical form, hence for the user to view these images with an HMD or the like, further transformation of the images is required. By performing the perspective projection transformation on a part of the region of the image, a less distorted image can be displayed. For example, an image 202 illustrated in FIG. 2B (a less distorted image) can be displayed by performing perspective projection transformation on a partial region 201 (region enclosed by a broken line) of the omnidirectional image 200 illustrated in FIG. 2A.

Figure 5:
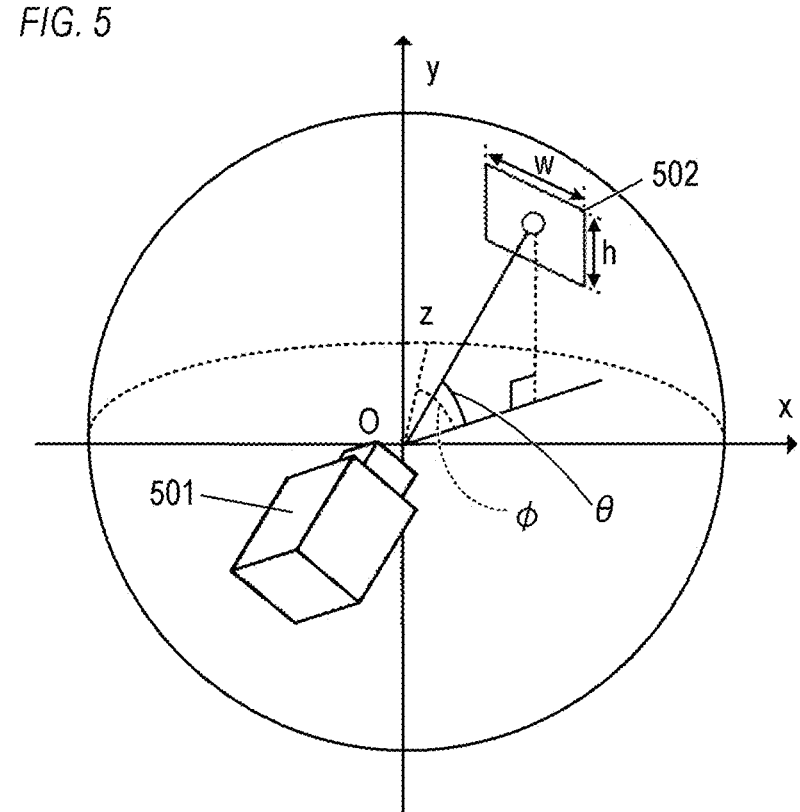
FIG. 5 is a diagram for describing perspective projection transformation.

FIG. 5 is a diagram indicating a relationship between a region for which the perspective projection transformation of the hemispherical image is performed, and a virtual camera in a three-dimensional space that is assumed in the perspective projection transformation. In the perspective projection transformation for the hemispherical image, it is assumed that there is a virtual camera 501 which corresponds to the position of the user viewing the hemispherical image. In the hemispherical image, a region having a width w×height h existing in the optical axis direction (θ, ϕ) of the virtual camera is determined as a region 502 for which the perspective projection transformation is performed. In Embodiment 1, the width w of the region 502 corresponds to the horizontal resolution of the display unit 110, and the height h of the region 502 corresponds to the vertical resolution of the display unit 110. Hereafter displaying a part extracted from the image is called "VR display". Image capturing for VR display is called "VR image capturing".

The assist image generation unit 106 stores displayed region information which indicates a VR-displayed region in the circular fisheye image. Further, the assist image generation unit 106 generates an assist image (circular fisheye icon) which is an item imitating the circular fisheye image. Then the assist image generation unit 106 fills a region corresponding to the VR-displayed region (a region corresponding to the region 201 in FIG. 2A) in the generated assist image, as illustrated in the assist image 300 in FIG. 3A. Thereby the user can easily recognize a region already confirmed in the VR display. For the assist image imitating the circular fisheye image, a reduced image of the circular fisheye image may be used.

The image combining unit 107 superimposes (combines) a plurality of images and outputs the result. In Embodiment 1, the image combining unit 107 superimposes the assist image, generated by the assist image generation unit 106, on the image outputted by the image processing unit 105, and outputs the combined image illustrated in FIG. 3B.

The operation unit 108 is constituted of such operation members as a cross key, a touch panel and a shutter button. Through the operation unit 108, the user can input various parameters (imaging parameters) of the imaging device, select a display type of the circular fisheye image, and select ON/OFF of the function to confirm a VR-displayed region (displayed region confirming function). The imaging parameters are an ISO sensitivity, a shutter speed, and the like, for example. In the display system of Embodiment 1, it is assumed that the circular fisheye display which displays the circular fisheye image as is, or the VR display which displays an image generated after performing the perspective projection transformation on the circular fisheye image, can be selected.

The display control unit 109 controls the image processing unit 105, the assist image generation unit 106, and the image combining unit 107 so that the image is displayed on the display unit 110 in accordance with the display system specified (set) using the operation unit 108.

The display unit 110 includes a display panel (e.g. organic EL panel or liquid crystal panel), and is controlled by the display control unit 109. For example, the display unit 110 is used as an EVF which displays a live view (LV) image. The display unit 110 may be an external apparatus that is connected to the imaging device via cable or wirelessly.

The lens information communication unit 111 acquires lens information of the lens unit 101, and sends the lens information to the display control unit 109.

FIG. 6A is flow chart indicating an example of LV display processing of the imaging device according to Embodiment 1.

In S601, the display control unit 109 acquires lens information from the lens unit 101, which is installed in the imaging device, via the lens information communication unit 111. Then the display control unit 109 determines whether the lens unit 101 is a lens unit for VR image capturing. Processing advances to S602 if the lens unit 101 is a lens unit for VR image capturing, or advances to S607 if not (if the lens unit 101 is a regular lens unit). The lens unit for VR image capturing is a lens unit that enables capturing an image in a wide range, and is a lens unit including a fisheye lens, for example.

In S602, the display control unit 109 determines whether the displayed region confirming function is ON (enabled). Processing advances to S603 if the displayed region confirming function is ON, or advances to S605 if not (if the displayed region confirming function is OFF (disabled)).

In S603, the display control unit 109 performs VR display processing with assist. Details on the VR display processing with assist will be described later with reference to FIG. 6B.

In S604, the display control unit 109 determines whether the user performed the end operation to end the LV display processing using the operation unit 108. The end operation is, for example, a user operation to instruct execution of reproduction display of the captured image, or a user operation to instruct execution of menu display. The LV display processing ends if the end processing is performed, or processing advances to S601 if not.

In S605, the display control unit 109 determines whether VR display is enabled. Processing advances to S606 if the VR display is enabled, or advances to S608 if not (if circular fisheye display is enabled).

In S606, the display control unit 109 performs the VR display processing without assist. Details on the VR display processing without assist will be described later with reference to FIG. 6C.

In S607, the display control unit 109 displays the image, captured using the regular lens unit, as is on the display unit 110.

In S608, the display control unit 109 displays the circular fisheye image, captured using the lens unit for VR image capturing, as is on the display unit 110.

The processing in S603 (VR display processing with assist) will be described with reference to FIG. 6B.

In S611, the display control unit 109 controls the image processing unit 105, and performs the perspective projection transformation on a range for which VR display is performed (display range). Thereby a perspective projection image to be viewed by the user is generated. The user can change the display range using such operation members as a cross key and a touch panel, included in the operation unit 108, for example. In the case of using the touch panel, a flick operation may be used to change the display range, or the user may tap a desired position within an assist image, so that the display range is changed to a range including a position corresponding to the tapped position. In the case of using the display unit 110 of an external apparatus, such as an HMD, connected to the imaging device, the display range may be changeable by changing the attitude of the external apparatus. The display range may be changed at an arbitrary timing.

In S612, the display control unit 109 stores the displayed region information, which indicates the range for which the perspective projection transformation was performed in S611 (range to be displayed this time), in the assist image generation unit 106. If the displayed region information has already been stored in the assist image generation unit 106, the display control unit 109 adds the information on the range to be displayed this time to the displayed region information stored in the assist image generation unit 106.

In S613, the display control unit 109 controls the assist image generation unit 106, and generates an assist image in which the displayed region information stored in the assist image generation unit 106 is reflected. For example, the assist image 300 illustrated in FIG. 3A is generated. In the case where the displayed region confirming function is switched from OFF to ON, the assist image generation unit 106 may generate an assist image that indicates a region which was VR-displayed while the displayed region confirming function was OFF.

In S614, the display control unit 109 controls the image combining unit 107, and combines (superimposes) the assist image generated in S613 on the perspective projection image generated in S611. As a result, a combined image 301 illustrated in FIG. 3B is generated, for example.

In S615, the display control unit 109 displays the combined image generated in S614 on the display unit 110.

The processing in S606 (VR display processing without assist) will be described in detail with reference to FIG. 6C.

S621 and S622 in FIG. 6C are the same as S611 and S612 in FIG. 6B, hence description thereof will be omitted. In S623, the display control unit 109 displays the generated perspective projection image as is on the display unit 110.

As described above, according to Embodiment 1, VR display is performed with combining an assist image in which the displayed region can be identified. Thereby a region for which the imaging result with the currently set imaging parameters has been confirmed can be easily recognized.

In the case of performing VR image capturing to acquire an image that can be stereoscopically viewed using the parallax of both eyes, as indicated in FIG. 7, the image device captures an image including a region 701 of the circular fisheye image for the left eye and a region 702 of the circular fisheye image for the right eye. As a standard for such an image, VR 180, for example, is used. Then to perform VR display, the perspective projection transformation is performed on both the circular fisheye image for the right eye and the circular fisheye image for the left eye, and the displayed region information is independently stored for the circular fisheye image for the right eye and the circular fisheye image for the left eye respectively. Further, an assist image, in which a region corresponding to the displayed region is filled, is superimposed (combined) on the captured image, and this combined image is displayed. For example, a combined image 801, illustrated in FIG. 8A, is displayed. In FIG. 8A, the VR display for the left eye and the VR display for the right eye are simultaneously performed. Also in FIG. 8A, text information 802 or 803 is displayed superimposed on the combined image 801, that is, on screen display (OSD) is performed. The text information 802 indicates that the VR display of the circular fisheye image for the left eye is progressing, and the text information 803 indicates that the VR display of the circular fisheye image for the right eye is progressing.

In a case where the imaging device cannot simultaneously execute both the VR display of the circular fisheye image for the left eye and the VR display of the circular fisheye image for the right eye, only one of the VR display of the circular fisheye image for the left eye and the VR display of the circular fisheye image for the right eye is executed. In this case, the user can switch the VR display to be executed between the VR display of the circular fisheye image for the right eye and the VR display of the circular fisheye image for the left eye. Further, as illustrated in the combined image 804 of FIG. 8B, a region corresponding to the displayed region information is filled only for the assist image corresponding to the circular fisheye image of which VR display is being executed. Further, as illustrated in the combined image 804 of FIG. 8B, OSD of the text information 805 may be displayed. The text information 805 indicates which of the circular fisheye image for the right eye and the circular fisheye image for the left eye is currently being VR-displayed.

This operation is applicable to a captured image which includes a plurality of image regions which are captured through at least three optical systems respectively. At least one of the plurality of image regions is partially displayed as the display range. Then an item to indicate which of the plurality of image regions is partially displayed as the display range, and an item to identify a displayed region in the image region corresponding to the display range, are displayed.

In Embodiment 1, the assist image is displayed at the upper left of the VR display, as illustrated in FIG. 3B, but the display position of the assist image may be movable, as illustrated in FIG. 3C, by a flick operation on the touch panel or by operating the cross key. Then in the case where the assist image overlaps on a position to be confirmed in the VR display, the user can move the assist image, and confirm the desired position in the combined image.

Embodiment 2

Embodiment 2 of the present invention will be described. In the following, description on aspects that are the same as Embodiment 1 (e.g. configuration and processing the same as Embodiment 1) may be omitted.

Figure 9:
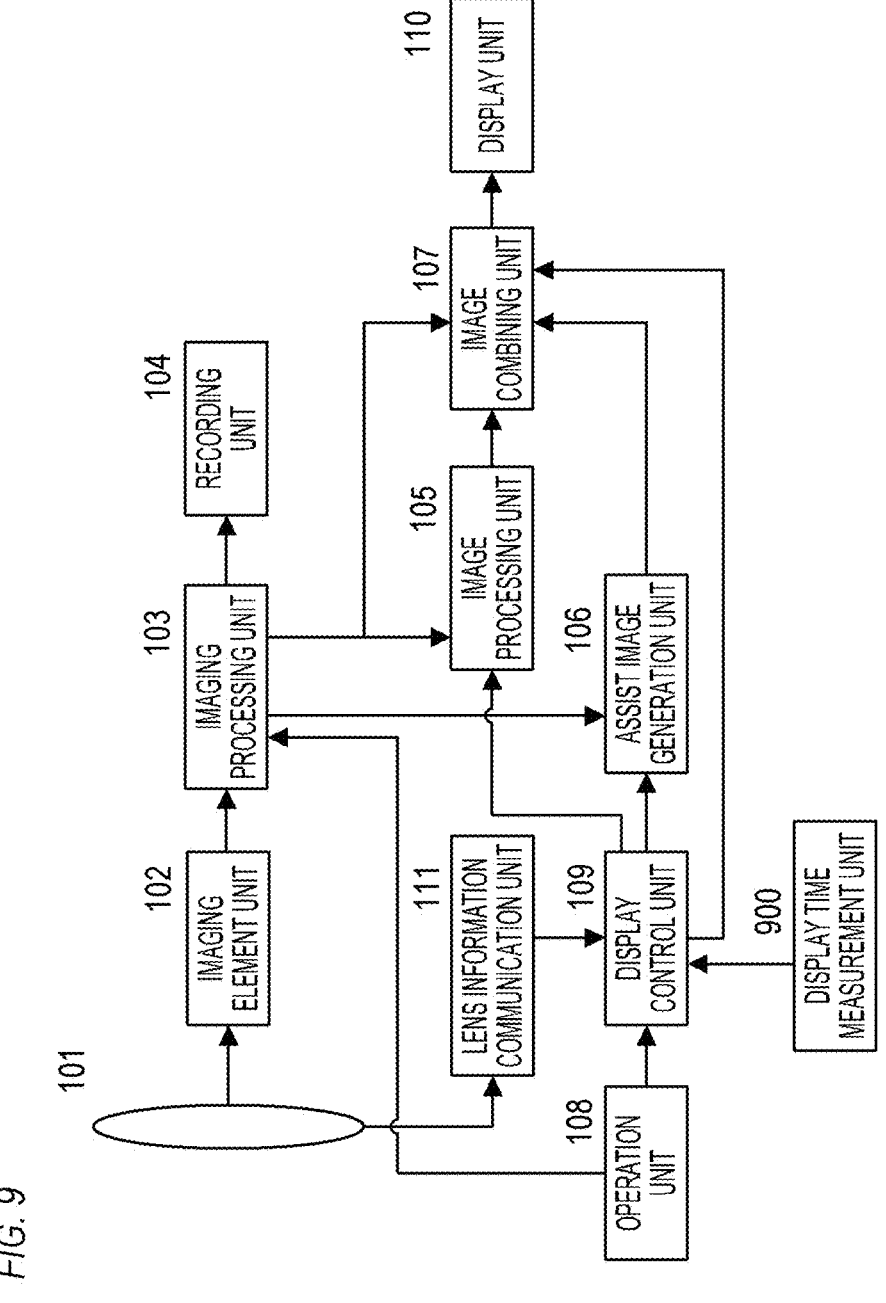
FIG. 9 is a block diagram indicating an imaging device according to Embodiment 2.

FIG. 9 is a block diagram indicating an imaging device according to Embodiment 2. The configuration of the imaging device according to Embodiment 2 (FIG. 9) is approximately the same as the configuration of the imaging device according to Embodiment 1 (FIG. 1). However the imaging device according to Embodiment 2 further includes a display time measurement unit 900. The display time measurement unit 900 measure time during which the same display range is being displayed continuously. Further, the imaging device according to Embodiment 2 includes an automatic confirmation mode, in which the display image is automatically changed when a predetermined time elapses, as an operation mode of the displayed region confirmation function. The user can specify ON/OFF of the automatic confirmation mode at an arbitrary timing using the operation unit 108.

Figure 10:
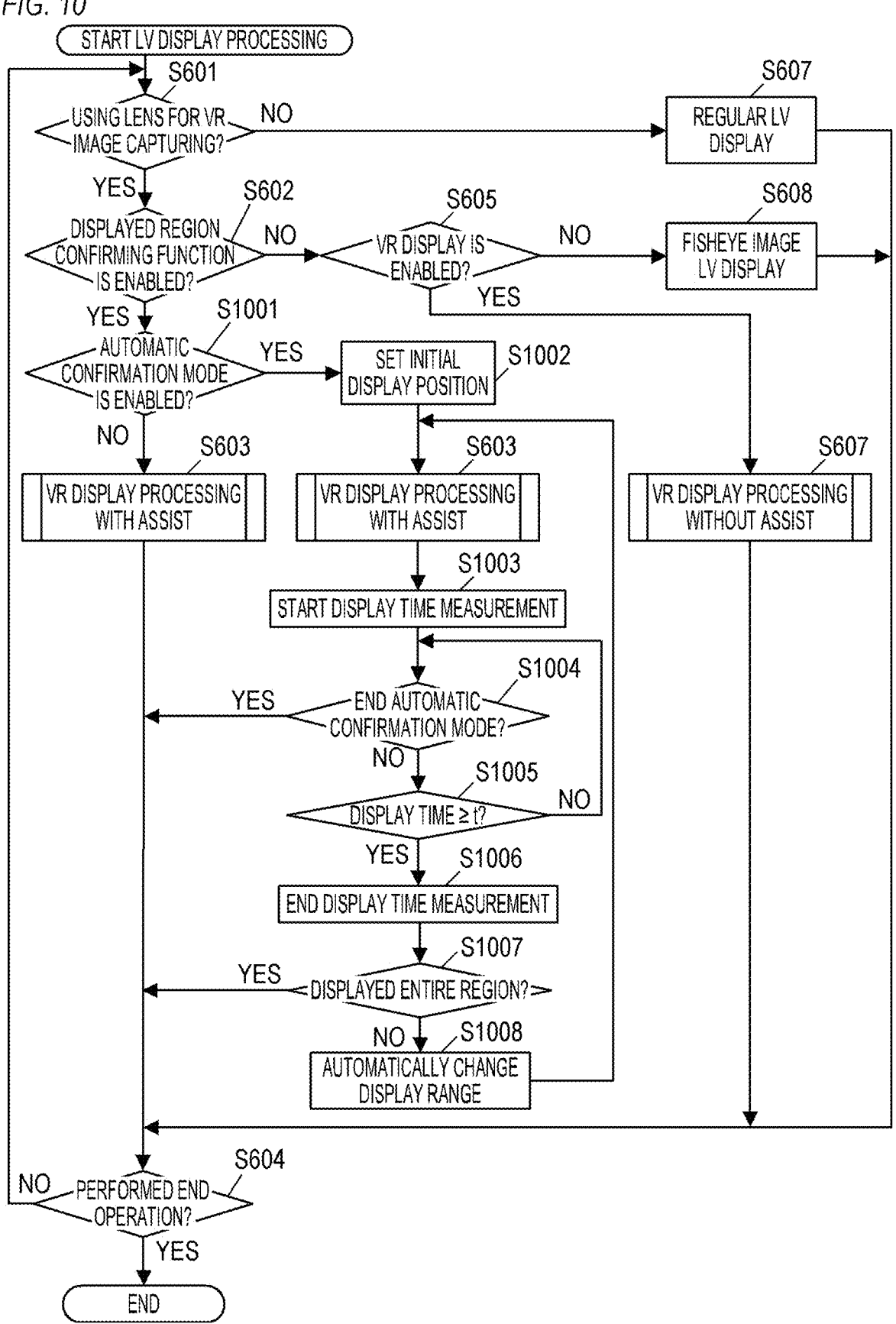
FIG. 10 is a flow chart of LV display processing according to Embodiment 2.

FIG. 10 is a flow chart indicating an example of LV display processing of the imaging device according to Embodiment 2.

In S1001, the display control unit 109 determines whether the automatic confirmation mode is ON (enabled). Processing advances to S1002 if the automatic confirmation mode is ON, or advances to S603 if not (if the automatic confirmation mode is OFF (disabled).

In S1002, the display control unit 109 sets an initial position of the display range in the automatic confirmation mode. The display range indicated by the initial position may be a center portion of the circular fisheye image, or an edge portion of the circular fisheye image, or a region that the user arbitrarily sets. The display range indicated by the initial position may also be a region that is not VR-displayed (region that is not displayed (that has not been confirmed), of which information is not include in the displayed region information).

In S1003, the display control unit 109 controls the display time measurement unit 900, and starts measuring time from the start of VR display of the current display range (display time of the current display range). LV display is sequentially updated even during the measurement of the display time.

In S1004, the display control unit 109 determines whether end operation of the automatic confirmation mode was performed. Processing advances to S604 if the end operation of the automatic confirmation mode was performed, or advances to S1005 if not.

In S1005, the display control unit 109 determines whether the display time, of which measurement started in S1003, is at least threshold time t. Processing advances to S1006 if the display time is at least the threshold time t, or advances to S1004 if not. The threshold time t is not especially limited, and may be a predetermined fixed time, or may be a value specified by the user (a value the user can change).

In S1006, the display control unit 109 controls the display time measurement unit 900, and ends the measurement of the display time of the current display range.

In S1007, the display control unit 109 determines whether the entire region of the captured circular fisheye image has been displayed, based on the displayed region information stored in the assist image generation unit 106. Processing advances to S604 if the entire region has been displayed, or advances to S1008 if not.

In S1008, the display control unit 109 changes the display range to the region that is not yet displayed, based on the displayed region information stored in the assist image generation unit 106.

As described above, according to Embodiment 2, the display range is automatically changed so that the entire range of the captured image is scanned. Thereby when the imaging result with the currently set imaging parameters is confirmed in advance, confirmation omission can be prevented.

Embodiment 3

Embodiment 3 of the present invention will be described. In the following, description on aspects the same as Embodiment 1 or 2 (e.g. configuration and processing the same as Embodiment 1 or 2) may be omitted. In Embodiment 3, the assist image is initialized when a predetermined condition is satisfied.

Figure 11:
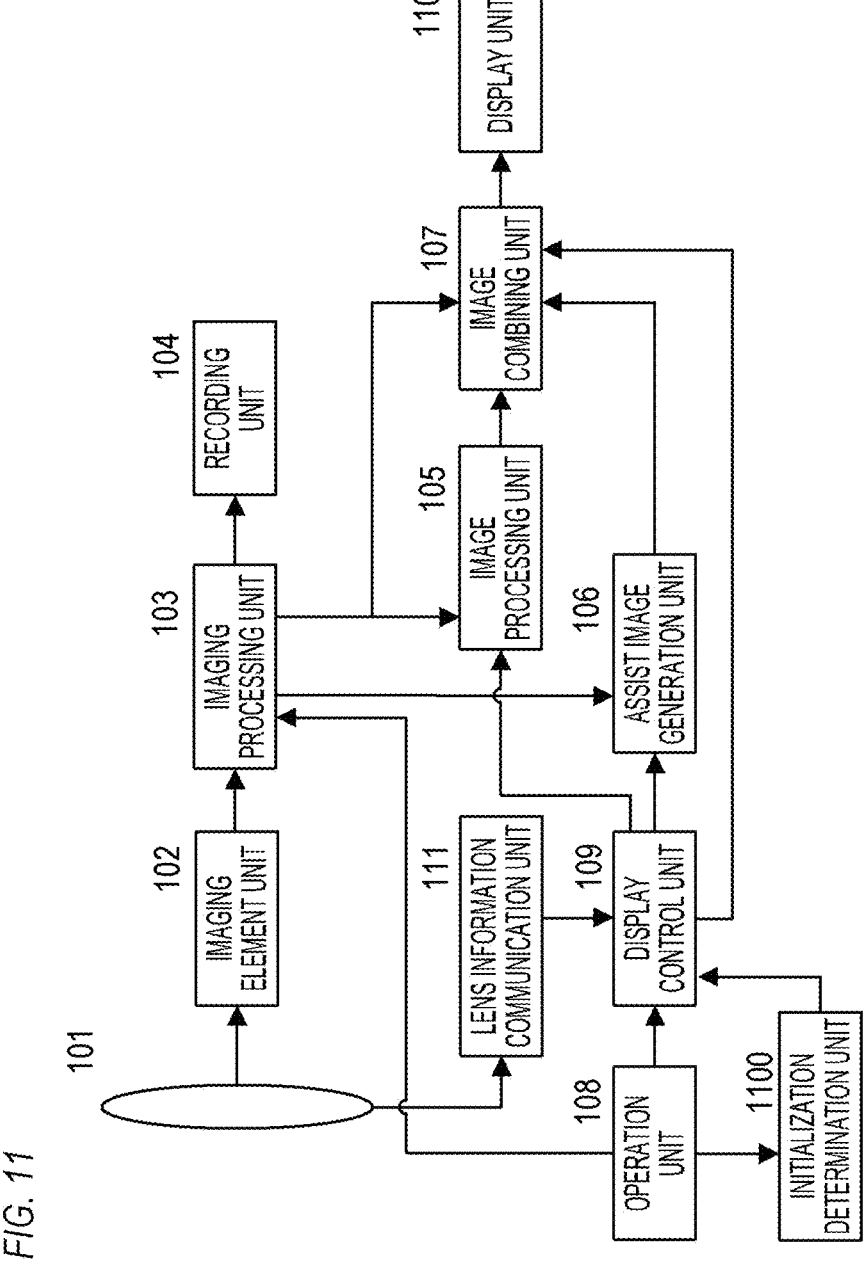
FIG. 11 is a block diagram indicating an imaging device according to Embodiment 3.

FIG. 11 is a block diagram indicating an imaging device according to Embodiment 3. The configuration of the imaging device according to Embodiment 3 (FIG. 11) is approximately the same as Embodiment 1 (FIG. 1). However, the imaging device according to Embodiment 3 further includes an initialization determination unit 1100. The initialization determination unit 1100 determines whether a predetermined operation that requires initialization of the displayed region information (initialization-required operation) was performed, and sends this determination result to the display control unit 109. The display control unit 109 initializes the displayed region information according to the initialization operation.

FIG. 12 is a flow chart indicating an example of the initialization processing of the displayed region information of the imaging device according to Embodiment 3. This initialization processing is executed in parallel with the LV display processing indicated in FIG. 6A or FIG. 10, for example.

In S1201, the display control unit 109 detects the user operation that is performed on the imaging device using the operation unit 108.

In S1202, the display control unit 109 controls the initialization determination unit 1100, and determines whether the user operation detected in S1201 is a predetermined operation that requires initialization of the displayed region information (initialization-required operation). Processing advances to S1203 if the initialization-required operation was performed, or advances to S1201 is not.

The initialization-required operation is, for example, an operation that the user specifies initialization of the displayed region information, or an operation to change the imaging parameters. The operation to change the imaging parameters is an operation that influences the imaging result, and is, for example, an operation to change ISO sensitivity, aperture value, white balance setting, focus setting and zoom setting of the lens, and the like. It is also determined that the initialization-required operation was performed when the imaging parameters are changed by half-depressing the shutter button.

It is also determined that the initialization-required operation was performed when the direction of the imaging device (imaging direction) or location of the imaging device (imaging position) is changed. In order to determine whether the direction or location of the imaging device is changed, the imaging device may include at least one of an acceleration sensor and a gyro sensor. Further, the initialization determination unit 1100 may calculate a difference between images (frames) captured at different imaging timings, so that it is determined that the direction or location of the imaging device changed when this difference becomes a threshold or more. The initialization determination unit 1100 may perform the determination combining a plurality of methods. The method for detecting the initialization-required operation is not especially limited.

In S1203, the display control unit 109 initializes (e.g. deletes) the displayed region information stored in the assist image generation unit 106.

As described above, according to Embodiment 3, the displayed region information is initialized in the case where the imaging parameters are changed, for example. Thereby confirmation omission can be prevented for a region for which imaging result need to be reconfirmed after changing the imaging parameters or the like.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present invention are also included in the present invention. The present invention also includes other configurations obtained by suitably combining various features of the embodiment.

According to the present invention, a region for which an imaging result has been confirmed can be easily recognized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-113559, filed on Jul. 11, 2023, which is hereby incorporated by reference herein in its entirety.

What is claimed is:

1. An electronic apparatus comprising:

a processor; and a memory storing a program which, when executed by the processor, causes the electronic apparatus to:

execute acquisition processing to acquire a live view image, and execute display control processing to perform geometric transformation for a display range, which is a partial region of the live view image, and to perform control so as to display a geometrically transformed image for display, where the display range is changeable, wherein in the display control processing, control is performed so as to further display an item which makes a displayed region including a region displayed before the display range is changed in the live view image and a region displayed by changing the display range in the live view image identifiable.

2. The electronic apparatus according to claim 1, wherein the item includes a reduced image generated by reducing the live image, and is an item to make a region corresponding to the displayed region in the reduced image identifiable.

3. The electronic apparatus according to claim 1, wherein in the display control processing, the item is initialized in a case where a predetermined condition is satisfied.

4. The electronic apparatus according to claim 3, wherein the predetermined condition is one in which an imaging position of the live view image is changed.

5. The electronic apparatus according to claim 3, wherein the predetermined condition is one in which an imaging direction of the live view image is changed.

6. The electronic apparatus according to claim 3, wherein the predetermined condition is one in which an imaging parameter is changed.

7. The electronic apparatus according to claim 6, wherein the imaging parameter includes at least one of ISO sensitivity, an aperture value, shutter speed, white balance setting, focus setting and zoom setting.

8. The electronic apparatus according to claim 1, wherein the live view image includes a plurality of image regions which are captured through a plurality of optical systems respectively, and in the display control processing, the control is performed so as to display a part of at least one of the plurality of image regions as a display range.

9. The electronic apparatus according to claim 8, wherein in the display control processing, control is performed so as to further display a second item to indicate an image region of the plurality of image regions, of which a part is displayed as the display range.

10. The electronic apparatus according to claim 8, wherein each of the plurality of image regions is a region of a circular fisheye image.

11. The electronic apparatus according to claim 1, wherein the geometric transformation is perspective projection transformation.

12. The electronic apparatus according to claim 1, wherein the live view image is an omnidirectional image or a hemispherical image.

13. The electronic apparatus according to claim 1, wherein in the display control processing, the display range is automatically changed.

14. The electronic apparatus according to claim 1, wherein the live view image includes two image region having parallax with each other, and in a case where both of the two image regions are displayed as geometrically transformed images for display, in the display control processing, control is performed so as to display, for each of the two image regions, the item which makes the displayed region identifiable.

15. The electronic apparatus according to claim 1, wherein by the item, a region that has been subjected to the geometric transformation and a region that has not been subjected to the geometric transformation are made identifiable.

16. A control method of an electronic apparatus, comprising:

acquiring a live view image;

performing geometric transformation for a display range, which is a partial region of the live view image, where the display range is changeable;

performing control so as to display a geometrically transformed image for display; and performing control so as to further display an item which makes a displayed region including a region displayed before the display range is changed in the live view image and a region displayed by changing the display range in the live view image identifiable.

17. A non-transitory computer readable medium that stores a program, wherein the program causes a computer to execute a control method of an electronic apparatus, the control method comprising:

acquiring a live view image;

performing geometric transformation for a display range, which is a partial region of the live view image, where the display range is changeable;

performing control so as to display a geometrically transformed image for display; and performing control so as to further display an item which makes a displayed region including a region displayed before the display range is changed in the live view image and a region displayed by changing the display range in the live view image identifiable.

* * * * *